United States Patent
Brenkus et al.

(10) Patent No.: US 11,535,438 B2
(45) Date of Patent: Dec. 27, 2022

(54) CONTAINER FOR STACKED FOOD PRODUCTS

(71) Applicant: Frito-Lay North America, Inc., Plano, TX (US)

(72) Inventors: Frank M. Brenkus, The Colony, TX (US); Eric Meyer, Bonham, TX (US); Jorge Maldonado, Frisco, TX (US); Benjamin Adam Avis, Little Elm, TX (US); Maximilliano Rodriguez, Hillside, NJ (US); Advait Bhat, White Plains, NY (US); Emanuele Teobaldo, Brooklyn, NY (US)

(73) Assignee: Frito-Lay North America, Inc., Plano, TX (US)

( * ) Notice: Subject to any disclaimer, the term of this patent is extended or adjusted under 35 U.S.C. 154(b) by 1 day.

(21) Appl. No.: 17/316,218

(22) Filed: May 10, 2021

(65) Prior Publication Data

US 2022/0355989 A1    Nov. 10, 2022

(51) Int. Cl.

| | |
|---|---|
| *B65D 65/40* | (2006.01) |
| *B65D 85/62* | (2006.01) |
| *B32B 1/02* | (2006.01) |
| *B32B 7/12* | (2006.01) |
| *B32B 15/20* | (2006.01) |
| *B32B 27/36* | (2006.01) |
| *B32B 27/10* | (2006.01) |

(Continued)

(52) U.S. Cl.
CPC ............... *B65D 65/40* (2013.01); *B32B 1/02* (2013.01); *B32B 7/12* (2013.01); *B32B 15/085* (2013.01); *B32B 15/20* (2013.01); *B32B 27/10* (2013.01); *B32B 27/32* (2013.01); *B32B 27/36* (2013.01); *B65D 85/62* (2013.01)

(58) Field of Classification Search
CPC ........ B65D 65/40; B65D 85/62; B32B 27/36; B32B 27/32; B32B 27/10; B32B 15/20; B32B 15/085; B32B 1/02
See application file for complete search history.

(56) References Cited

U.S. PATENT DOCUMENTS

| | | |
|---|---|---|
| 6,152,359 A | 11/2000 | Clark |
| 6,179,203 B1 | 1/2001 | Toussant et al. |
| 6,309,717 B1 | 10/2001 | Qiu et al. |

(Continued)

FOREIGN PATENT DOCUMENTS

| | | |
|---|---|---|
| JP | 2002104372 A2 | 4/2002 |
| WO | 1979001113 | 12/1979 |
| WO | 2018/224170 | 12/2018 |

OTHER PUBLICATIONS

International Search Report and Written Opinion issued in PCT/US2022/028273 dated Jul. 14, 2022.

(Continued)

*Primary Examiner* — Ellen S Hock
(74) *Attorney, Agent, or Firm* — Barnes & Thornburg LLP; Stephen C. Smith

(57) ABSTRACT

A container for stacked food products, such as potato chips, is provided. The container includes composite laminate that includes one or more layers of cardboard. The container has a non-circular shape. The container has a horizontal cross-section with end portions that have a constant radius along their length and side portions that have a changing radius along their length wherein the end portions and the side portions transition between each other continuously.

20 Claims, 8 Drawing Sheets

(51) Int. Cl.
    *B32B 15/085*     (2006.01)
    *B32B 27/32*     (2006.01)

(56) References Cited

U.S. PATENT DOCUMENTS

| | | |
|---|---|---|
| D466,809 S | 12/2002 | Sagel |
| D467,800 S | 12/2002 | Chen et al. |
| 6,540,132 B1 | 4/2003 | Lowry et al. |
| 7,798,353 B2 | 9/2010 | Blythe et al. |
| 9,023,411 B2 | 5/2015 | Maatta et al. |
| 9,023,445 B2 | 5/2015 | Guzzi et al. |
| 10,526,105 B2 | 1/2020 | Guertin |
| 10,744,720 B2 | 8/2020 | Clougherty |
| 2009/0123677 A1 | 5/2009 | Sins |
| 2009/0277917 A1 | 11/2009 | McGoy et al. |
| 2013/0129874 A1 | 5/2013 | Fenske et al. |

OTHER PUBLICATIONS

Custom Shapes retrieved from https://paramounttube.com/custom-shapes/.

Rigid Tubes retrieved from https://www.westrock.com/products/specialty-printing-and-packaging/rigid-tubes.

Images of containers publically available before May 10, 2021.

Lay's Stax—Images of containers publically available before May 10, 2021.

Pringles—Images of containers publically available before May 10, 2021.

Walkers Stax Original—Images of containers publically available before May 10, 2021.

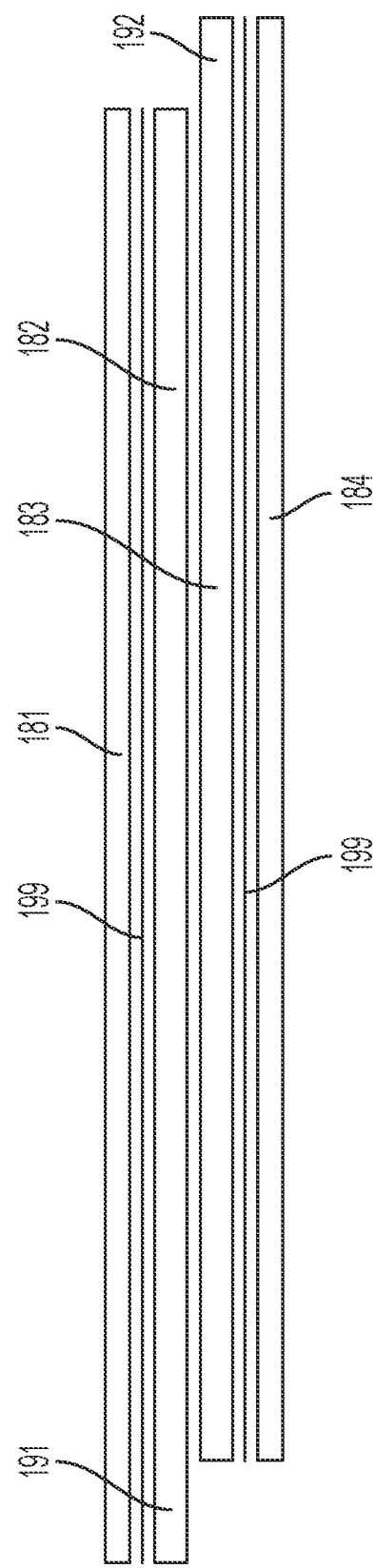

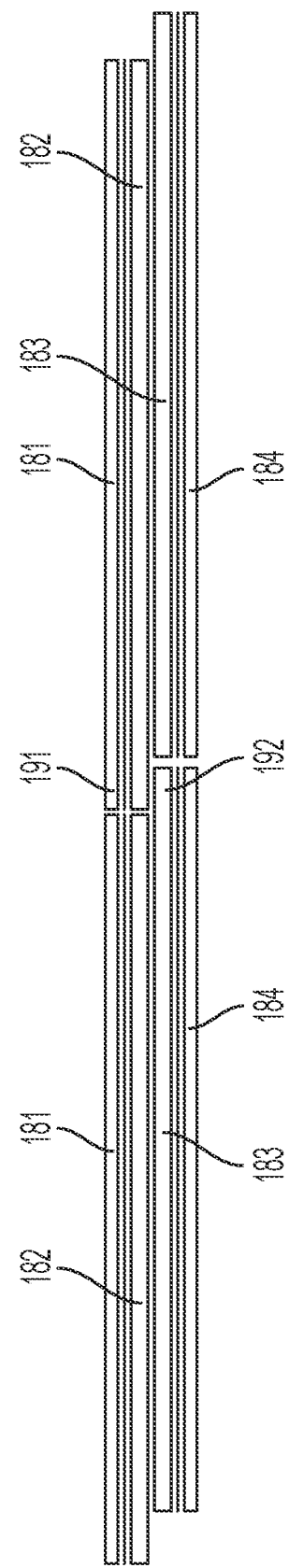

CONTAINER FOR STACKED FOOD PRODUCTS

BACKGROUND

The subject disclosure is related to containers that store stacked food products, such as stacked potato chips. It is desired to construct the container with materials that are recyclable. A significant constraint for elongate containers for stacked food products is resistance to implosion, which is a design constraint for food products that are packaged at a relatively high altitude and low relative humidity, and then transported to locations with low altitude and high relative humidity. This specification discloses a design for a container for stacked food items that is made from recyclable materials and is strong enough for significant changes in differential pressure across the container, such as the reasonable worst case differential pressure due to the elevation, temperature, and humidity extremes that can be found in the United States.

BRIEF SUMMARY

A first representative embodiment of the disclosure is provided. The embodiment includes a container for storing stacked food products. The container includes a composite body formed into an elongate enclosure between an open top end and a bottom end, the composite body including a plurality of layers that are fixed together. The composite body extends between the open top and bottom end with a consistent cross-section. The composite body includes a seam that extends between the open top end and the bottom end, the helical seam fixes elongate portions of the plurality of layers together and the closed bottom is fixed to the bottom end of the composite body, the closed bottom comprises a cardboard portion that extends across the bottom end of the composite body. The composite body includes an inner liner layer, a first body layer, a second body layer, and an outer layer, a first adhesive is provided to affix the inner liner layer to the first body layer, and a second adhesive is provided to affix the second body layer to the outer layer. The inner layer comprises one of PE or PET, the first and second body layers comprise cardboard, and the outer layer comprises paper. The composite body comprises a constant horizontal cross-section along its length, wherein the horizontal cross-section includes opposite first and second end portions and opposite first and second side portions, wherein each of the first and second end portions are arcuate and each of the first and second side portions are arcuate. The first and second side portions each extend between first and second ends and the first and second end portions each extend between first and second ends, wherein the first side portion extends from the first end of the second end portion and the second end of the first end portion and the second side portion extends from the second end of the second end portion and the first end of the first end portion. The first end portion has a constant radius about a first focus point and the second end portion has a constant radius about a second focus point, wherein the first and second focus point are both disposed upon a line that extends through a geometric center of the horizontal cross-section of the container. Each of the first and second side portions have a changing radius along its length extending from a minimum at each of the first and second ends thereof to a maximum at a center thereof, and the transitions between the adjacent ends of the various end and side portions are continuous.

Another representative embodiment of the disclosure is provided. The embodiment includes a container for storing stacked food products. The container includes a composite body formed into an elongate enclosure between an open top end and a bottom end, the composite body including a plurality of layers that are fixed together, the composite body extending between the open top and bottom end with a consistent cross-section. The composite body includes a helical seam that extends between the open top end and the bottom end, the helical seam fixes elongate portions of the plurality of layers together. A closed bottom is fixed to the bottom end of the composite body, the closed bottom comprises a cardboard portion that extends across the bottom end of the composite body. The composite body includes an inner liner layer, a first body layer, a second body layer, and an outer layer, a first adhesive is provided to affix the inner liner layer to the first body layer, and a second adhesive is provided to affix the second body layer to the outer layer. The inner layer comprises one of PE or PET. The first and second body layers comprise cardboard. The outer layer comprises paper. The composite body comprises a constant horizontal cross-section along its length, wherein the horizontal cross-section includes opposite first and second end portions and opposite first and second side portions, wherein each of the first and second end portions are arcuate and each of the first and second side portions are arcuate. The first and second side portions each extend between first and second ends and the first and second end portions each extend between first and second ends, wherein the first side portion extends from the first end of the second end portion and the second end of the first end portion and the second side portion extends from the second end of the second end portion and the first end of the first end portion. The first end portion has a constant radius about a first focus point and the second end portion has a constant radius about a second focus point, wherein the first and second focus point are both disposed upon a line that extends through a geometric center of the horizontal cross-section of the container. Each of the first and second side portions have a changing radius along its length extending from a minimum at each of the first and second ends thereof to a maximum at a center thereof. The transitions between the adjacent ends of the various end and side portions are continuous. Each transition between the respective first and second end portions and the respective first and second side portion includes at a position that is 27 mm from the proximate first or second focus point and 33.1 mm from the geometric center, and wherein the first and second end portions have a constant radius of 27 mm, and wherein an arc length of each of the first and second side portions is 86.8 degrees.

Yet another representative embodiment is provided. The embodiment includes a container for storing stacked food products. The container includes a composite body formed into an elongate enclosure between an open top end and a bottom end, the composite body including a plurality of layers that are fixed together, the composite body extending between the open top and bottom end with a consistent cross-section. The composite body includes a helical seam that extends between the open top end and the bottom end, the helical seam fixes elongate portions of the plurality of layers together. A closed bottom is fixed to the bottom end of the composite body, the closed bottom comprises a cardboard portion that extends across the bottom end of the composite body. The composite body includes an inner liner layer, a first body layer, a second body layer, and an outer layer, a first adhesive is provided to affix the inner liner layer to the first body layer, and a second adhesive is provided to affix the second body layer to the outer layer. The inner layer comprises one of PE or PET. The first and second body layers comprise cardboard. The outer layer comprises paper. The composite body comprises a constant horizontal cross-section along its length, wherein the horizontal cross-section includes opposite first and second end portions and opposite first and second side portions, wherein each of the first and second end portions are arcuate and each of the first and second side portions are arcuate. The first and second side portions each extend between first and second ends and the first and second end portions each extend between first and second ends, wherein the first side portion extends from the first end of the second end portion and the second end of the first end portion and the second side portion extends from the second end of the second end portion and the first end of the first end portion. The first end portion has a constant radius about a first focus point and the second end portion has a constant radius about a second focus point, wherein the first and second focus point are both disposed upon a line that extends through a geometric center of the horizontal cross-section of the container. Each of the first and second side portions have a changing radius along its length extending from a minimum at each of the first and second ends thereof to a maximum at a center thereof, wherein the maximum radius is 81.7 mm. The transitions between the adjacent ends of the various end and side portions are continuous. Each transition between the respective first and second end portions and the respective first and second side portion includes at a position that is 27 mm from the proximate first or second focus point and 33.1 mm from the geometric center, and wherein the first and second end portions have a constant radius of 27 mm. An arc length of each of the first and second side portions is 86.8 degrees.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

BRIEF DESCRIPTION OF THE DRAWINGS

FIG. 5 is a schematic sectional view of the composite laminate that is spiral bound to form the container of FIG. 1.

FIG. 6 is a schematic sectional view of two adjacent composite laminates to form a spiral seam, which is helical.

DETAILED DESCRIPTION OF THE PREFERRED EMBODIMENTS

Turning now to FIGS. 1-6 a container 10 for a food product is provided. In some embodiments, the container 10 may be a container for a plurality of stacked food products, such as potato chips. In some embodiments, the stacked food products may be a plurality of stacked food products that are formed with the same size and shape, and which have a generally oval shape.

Figure 1:
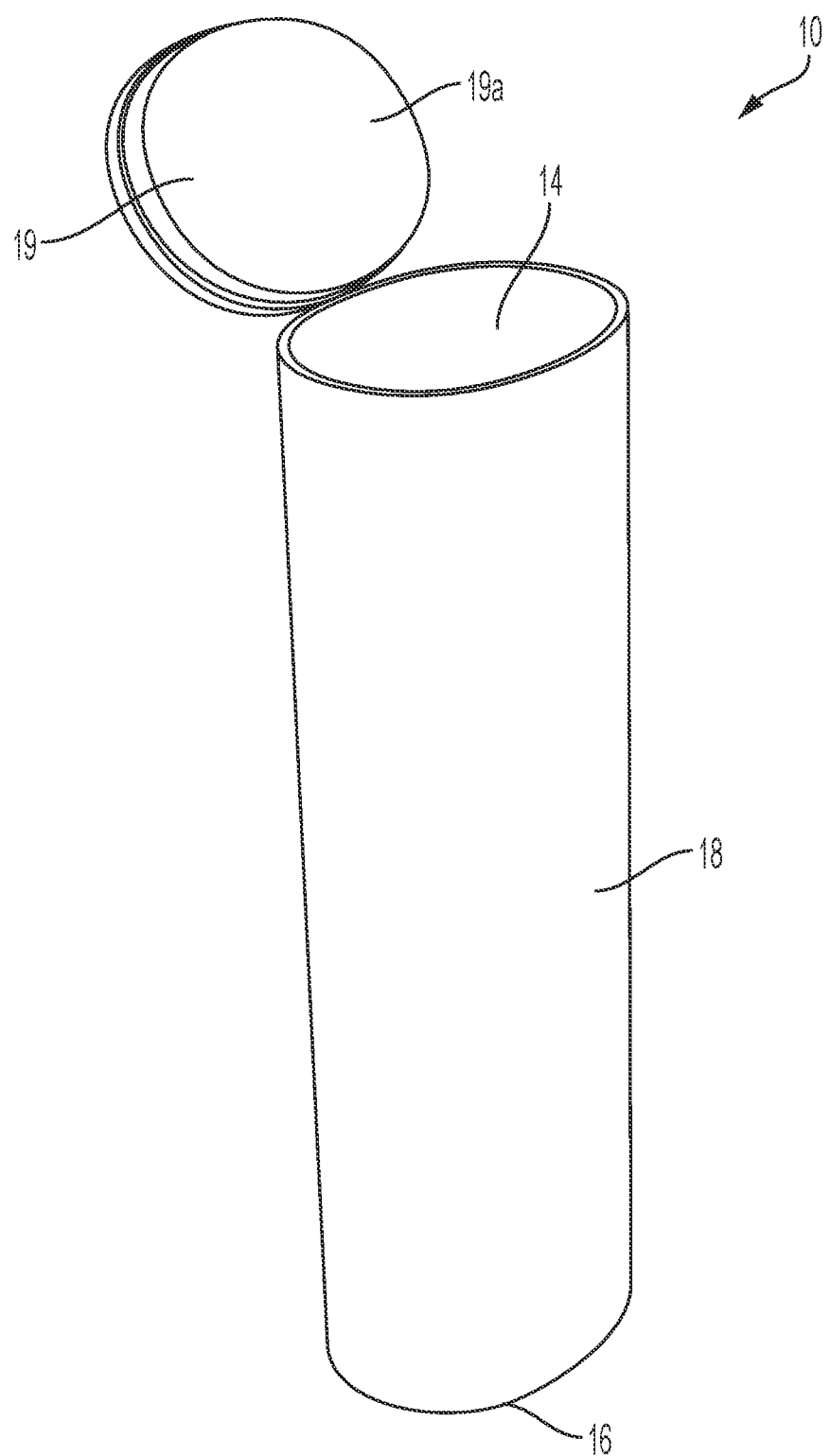
FIG. 1 is perspective view of a container for holding a food product, such as a plurality of stacked food products.

The container 10 may be vertically oriented, with an open top 14, a closed bottom 16, and a side wall 18 that forms a wall of the container 10. The side wall 18 may be formed from a composite body that is discussed below. In a preferred embodiment, the side wall 18 is formed with a spiral winding process to establish a helical seam, while in other embodiments, the side wall 18 may be formed with a vertical seam, or the side wall may be formed via an extrusion. For example, the side wall 18 may be formed via the linear draw or convolute processes. In some embodiments, as depicted in FIG. 1, a lid 19 may be provided that is fixed to the side wall with a hinge, such that the lid 19 and be opened and closed upon the container 10. When closed, a recessed part 19*a* fits within the side wall 18.

The closed bottom may be formed with a paperboard portion, which may be a laminate composite. In some embodiments, the closed bottom may have an polymeric inner layer with one or more paperboard layers outboard from the polymeric layer (with the polymeric inner layer facing the inner volume of the container 10. In still other embodiments, the bottom may be tin metal plate. The closed bottom 16 may be fixed to the side wall 18 with various attachment structures and methods that are known in the art, such as via adhesive, via a bent joint, or other structures. The open top 14 may receive a conventional plastic cap, or may receive a paper top.

The side wall 18 may be a composite body formed by an elongate composite laminate 180 that includes with multiple layers that extend along the length the laminate (which is either spirally wound or formed with a vertical seam). In some embodiments as depicted in FIG. 5, the laminate 180 may include four layers, which include an inner liner layer 181, a first body layer 182, a second body layer 183, and an outer layer 184.

Figure 5A:
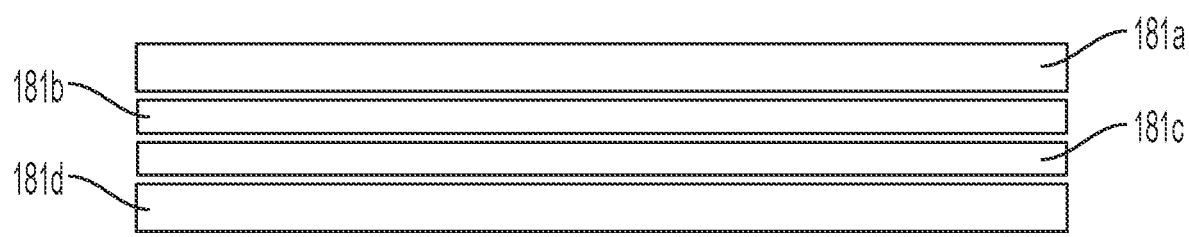
FIG. 5*a* is a schematic sectional view of a composite laminate that may be used for the inner layer.

The inner liner layer 181 may be a polymeric material, such as PE (polyethylene) or PET (polyethylene terephthalate-polyester) or other polymeric material that is suitable for contact with food. In some embodiments the inner liner 181 may be metalized PET (PET MET, or PE+PET MET). In some embodiments, the inner layer may be a composite of various layers with various materials. As depicted in FIG. 5*a*, in an embodiment, the inner layer may include a thin layer of paper 181*a*, then a layer of PE 181*b*, then a metal layer (such as Aluminum) 181*c*, then a layer of PE 181*d*, with this layer of PE (181*d*) being exposed on the inner surface of the side wall.

The first and second body layers 182, 183 may be a paperboard material, such as cardboard. In some embodiments, the first and second body layers 182, 183 may be one or more of cardboard, paperboard, a fibrous material, or a composite material. In the preferred embodiment, the first and second body layers are cardboard. In some embodiments, the first and second body layers may form three or more layers. In the preferred embodiment, the outer layer 184 is paper. The outer layer 184 may include various inks and lacquers for display purposes In some embodiments, the inner layer 181 may be a material (such as those discussed above) that is 80 g/m2 and the outer layer 184 may be a material that is 100 g/m2.

In some embodiments, one or the combination of both of the first and second body layers 182, 183 may be 250 g/m2, 310 g/m2, 325 g/m2, or 360 g/m2. In some embodiments, each layer may be within the range of 100 g/m2 to 200 g/m2, including all values within this range. In the preferred embodiment discussed herein, the both of the first and second body layers 182, 183 are 310 g/m2. In some embodiments, the first and second body layers 182, 183 and include a third body layer. In this embodiment, the three body layers may be the same material and thickness. In another embodiment with three body layers, the body layers may be different materials and/or different thicknesses.

With reference to FIGS. 5 and 6, a cross-sectional view of the composite laminate 180 used to form the side wall is provided. The first and second body layers 182, and 183 may be formed with first body layer having a portion that extends past an elongate left edge 191 of the remaining left edges of the laminate and the second body layer 183 having a portion that extends past an elongate right edge 192 of the remaining layers of the composite. In some embodiments, the inner layer may be the same size as the first body layer 182 and the outer layer 184 may be the same size as the second body layer 183, which results in complete coverage of the outer surface of the side wall when formed of both the inner layer 181 and the outer layer 184 (with the exception of the seam that is formed when forming the body). In some embodiments, the inner layers of adjacent portions may interact/connect to each other during the spiral winding process to form a seal to prevent communication through the seam of the spiral wound side wall 18. In some embodiments, the inner layers may form an Anaconda seal along the seam, as is known in the art.

Some or all of the various layers of the composite laminate 180 may be attached together in various manners, such as with adhesive (FIG. 5, elements 199, schematic) or by heat setting the layers together. In FIG. 5, the inner layer 181 and the first body layer 182 are depicted as fixed together with an adhesive 199, and the outer layer 184 and the second layer 183 are depicted as fixed together with an adhesive. Similarly, when two portions of the composite are next to each other, with the extending left edge 191 of one portion of the composite extending over the extending right edge 192 of the adjacent second portion of the composite, an adhesive may be provided between the extending edges 191, 192 to fix the adjacent portions together.

In some embodiments, the side wall 18 may be formed (for example in the ways discussed above) around a mandrel, to allow the side wall to be formed with the size and geometry as discussed below.

Figure 3:
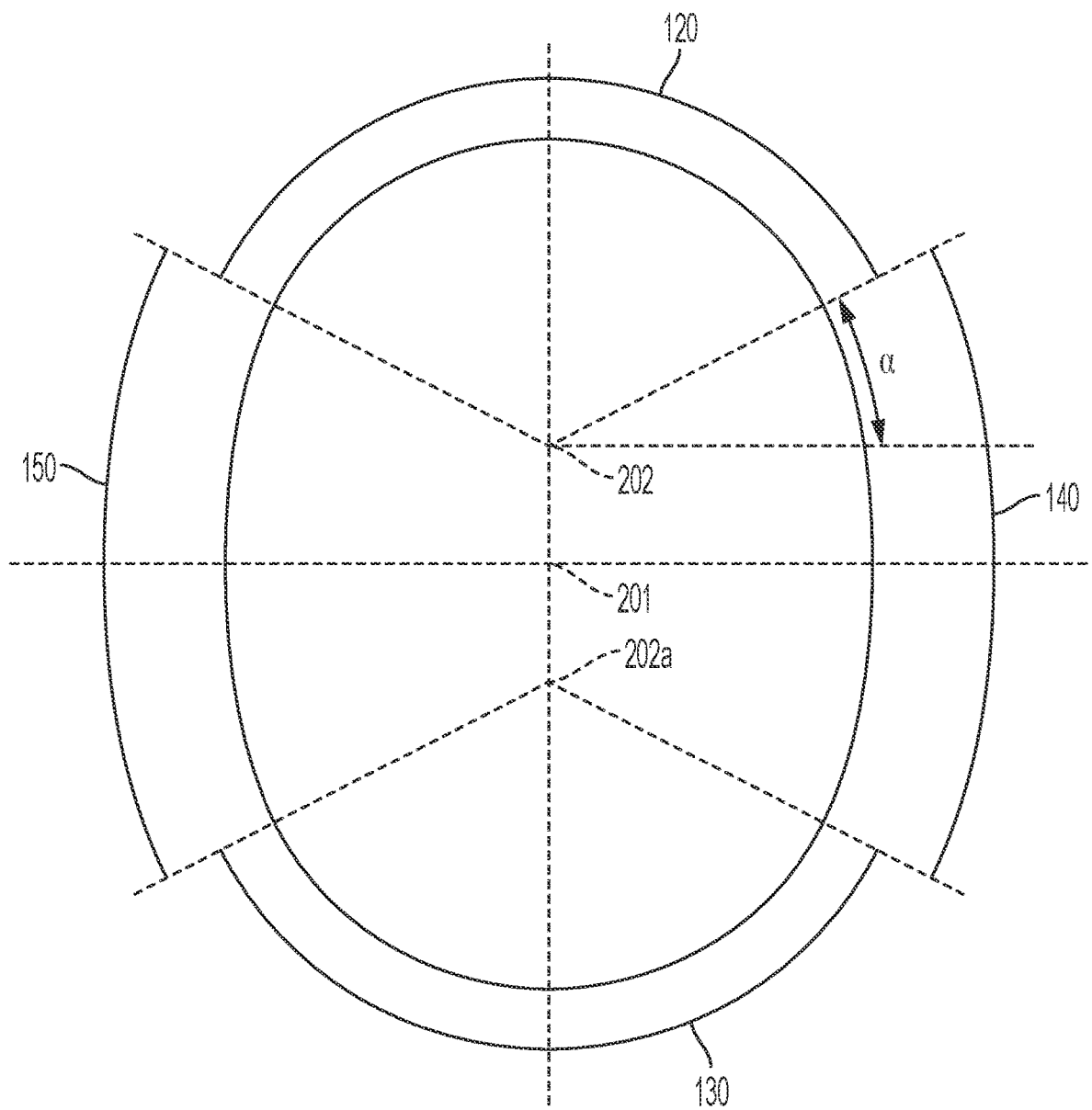
FIG. 3 is another horizontal cross-sectional view of the container of FIG. 1, with the thickness of the composite material forming the container not drawn to scale.

Turning now to FIG. 3, the geometry of the side wall 18 is provided. Note that the container 10 may be formed with variable lengths of the side wall 18, which result in different heights of the container 10 such as to support and enclose (when the lid 21 is disposed thereon) differing amounts of food products, such as potato chips, within the container.

The side wall 18 is formed with the same geometry along its length, regardless of the length of the side wall 18. The side wall includes opposite first and second side portions 140, 150, and opposite first and second end portions 120, 130. The first side portion 140 extends from first end 141 to opposite second end 142. The second side portion 150 extends from first end 151 to opposite second end 152. The first end portion 120 extends from a first end 121 to second end 122. The second end portion 130 extends from a first end 131 to a second end 132. In some embodiments, both of the first and second end portions 120, 130 have the same size and geometry, and both of the first and second side portions 140, 150 have the same size and geometry.

Figure 2:
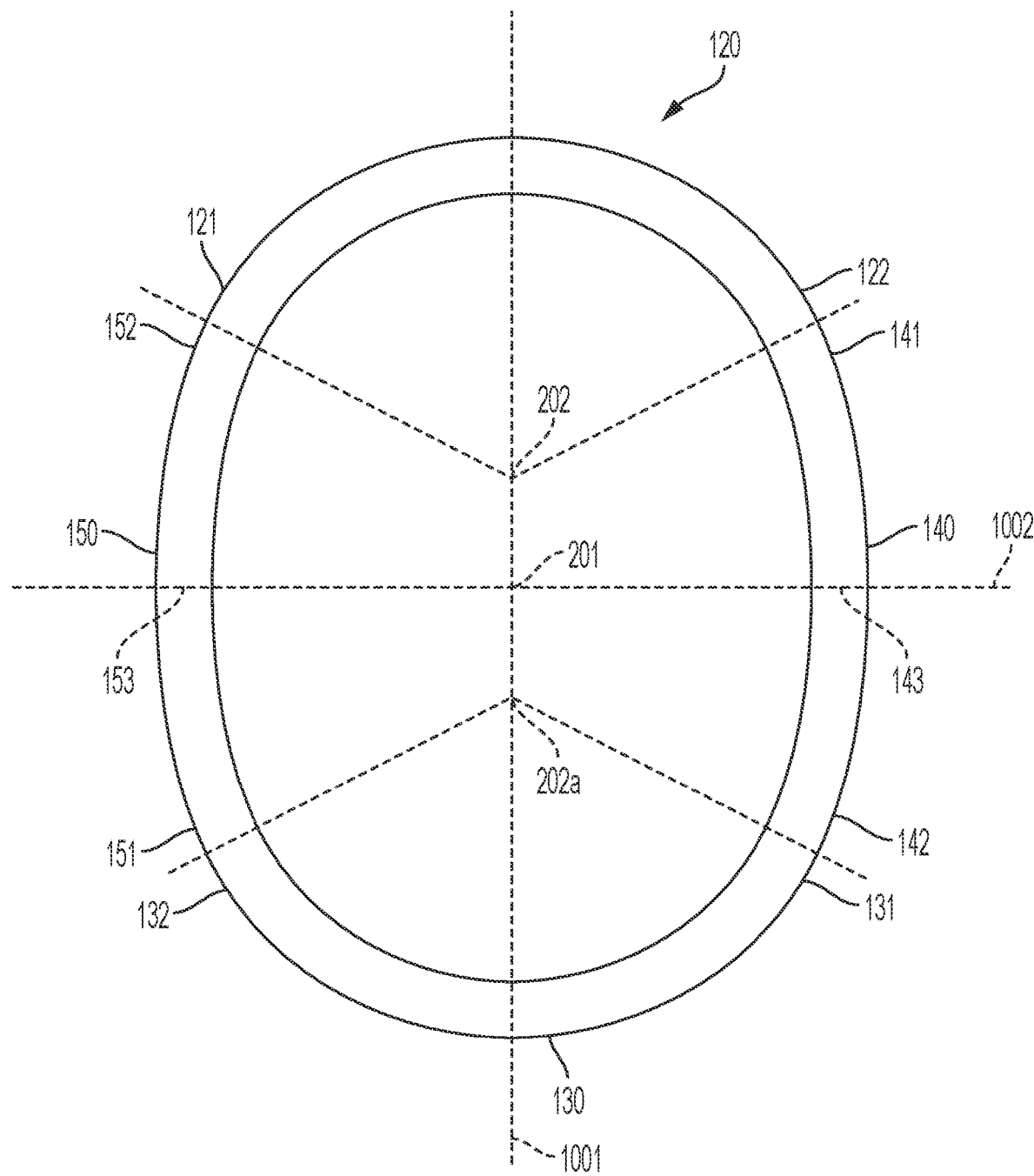
FIG. 2 is a horizontal cross-sectional view of the container of FIG. 1, with the thickness of the composite material forming the container not drawn to scale.
Figure 4:
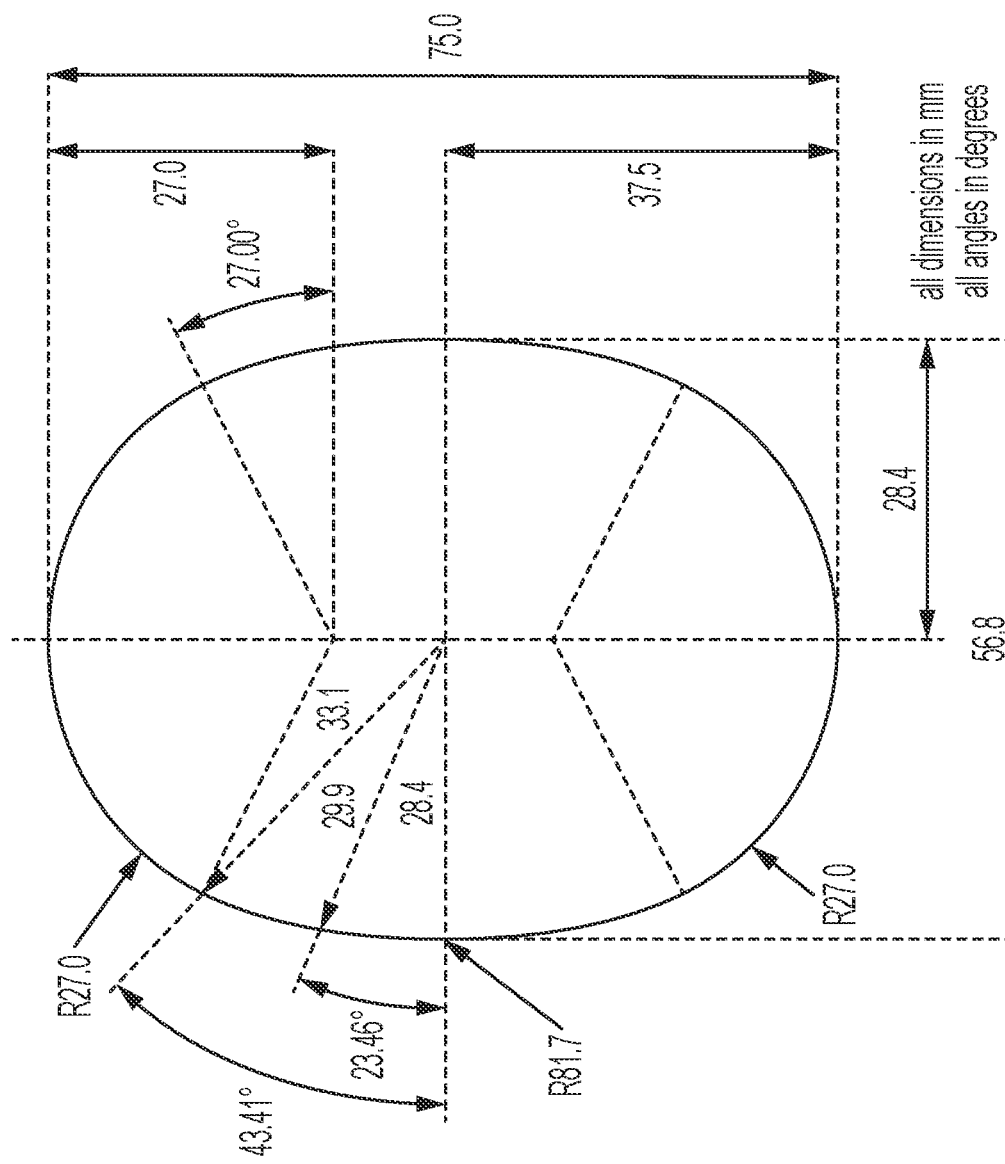
FIG. 4 is another horizontal cross-sectional view of the container of FIG. 1, with the thickness of the composite material forming the container not drawing to sale.

As best understood with reference to FIGS. 2-4, the various adjacent end portions are connected to each other in a continuous manner, with the curves between the various adjacent portions (at the neighboring ends) being continuous (putting aside any minor localized discontinuities due to the seam that fixes adjacent portions together). As depicted in FIG. 2, the first end of the first end portion 120 transitions to the second end 152 of the second side portion 150. The first end 151 of the second side portion 150 transitions to the second end 132 of the second end portion 130, the first end 131 of the second end portion 130 transitions to the second end 142 of the first side portion 140. The first end 141 of the first side portion 140 transitions to the second end 122 of the first end portion 120.

The side wall 18 defines a geometric center 201 and first and second focus points 202, 202a. The geometric center 201 and the first and second focus points 202, 202a are each disposed upon a line 1001 for a single geometric cross-section, or a plane for the entire side wall 18. The line 1001 (and plane) extends through the center of the first and second end portions 120, 130 and establishes a mirror plane between the portions of the side wall on opposite sides of the line 1001 (plane).

Each of the first and second end portions 120, 130 may be formed with a constant radius about the respective first or second focus point (the first end portion is formed about the first focus point 202, and the second end portion 130 is formed about the second focus point 202a). In a preferred embodiment, the radius of each of the first and second end portions is 27 mm about the respective focus point (202, 202a) between the respective first and ends. In this embodiment, the first and second focus points 202, 202a are each located about 10.5 mm from the geometric center 201. In this embodiment, the horizontal cross-section is about 75 mm long (from a center point 125 of the first end portion 120 to a center point 135 of the second end portion 130) and about 56.8 mm wide (from a center point 145 of the first side portion 140 to a center point 155 of the second side portion 150).

The first and second side portions 140, 150 are arcuate with a changing radius along their length extending from a minimum radius at the end points to a maximum radius at the center point 143, 153. In a preferred embodiment, both of the first and second ends 141, 142, and 151, 152 having a radius of about 27 mm at their end point (where the side portions transition to the adjacent end portions 120. 130), with a maximum radius of about 81.7 mm at the center portion 143, 153 of each of side portion 140, 150. As depicted in FIG. 2, the center portions 143, 153 of the respective first and second side portions 140, 150 each lie upon a line 1002 (or a plane for the entire length of the side wall 18) that extends through the geometric center 201. The line 1002 is perpendicular to the line 1001 that extends through the geometric center 201 and the first and second focal points 202, 202a. In some embodiments, the line 1002 establishes a mirror plane between the portions on opposite side of the line 1002.

As discussed above, in a preferred embodiment, the first end second end portions 120, 130 each transition to the adjacent of the first and second side portions 140, 150 at a location where the radius of curvature is 27 mm. This transition point is at a distance of about 33.1 mm from the geometric center 201. In this embodiment, the respective center 145, 155 of each of the first and second side portions 140, 150 is a distance of about 28.4 mm from the geometric center 201. As discussed above, the respective center 145, 155 has a radius of curvature of 81.7 mm.

In this embodiment, the arc length of the varying arcuate first and side portions 140, 150 is about 86.8 degrees, and therefore the arc length of each of the first and second end portions 120, 130 (with constant radius) is about 93.2 degrees.

The embodiment disclosed above is one specific preferred embodiment of the container, which, as discussed below, has been determined via testing to have exemplary strength characteristics in comparison to other container designs with other side wall geometries. Accordingly, the embodiment above consists of a side wall with a constant cross-sectional geometry with the exact dimensions that is discussed above (e.g. the first and second portions have a radius to the respective focal point of exactly 27 mm, rather than "about 27 mm."). In other embodiments, the cross-sectional geometry of the side walls 18 may be within the ranges presented by "about [dimension OR angle]" with the term about being defined to include the reference value as well as a range of plus or minus 5 percent of the reference value. The geometry of the embodiment disclosed above has been found to optimize the strength characteristics of the container and achieves unexpected strength in comparison to other non-circular geometries that are available conventionally.

Figure 7:
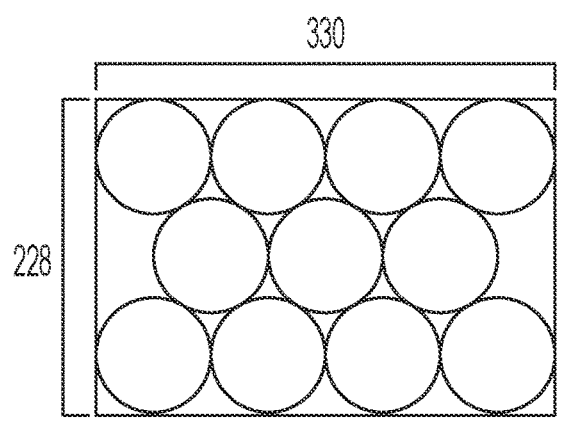
FIG. 7 is a view of a plurality (11) of circular containers that are positioned within a shipping box with the dimensions of 330 mm×228 mm.
Figure 8:
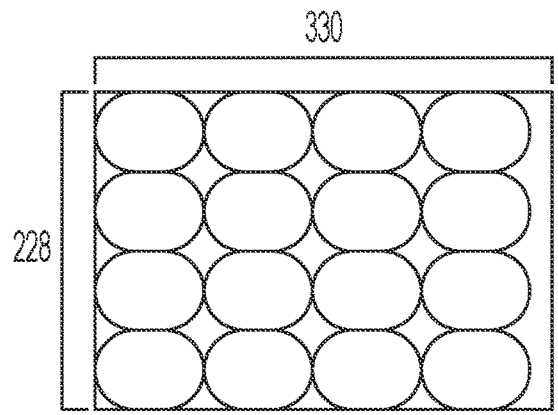
FIG. 8 is a view of a plurality (16) of generally oval containers that are positioned within the same sized shipping box as FIG. 7.

It is noted that circular geometries for tubular containers, suitable for stacked products, such as potato chips, have the greatest strength ratio for a given cross-sectional area. However, containers that have an elliptical or oval horizontal cross-section (or another shape that has one dimension along a cross-sectional plane that is longer than the perpendicular dimension along the same cross-sectional plane) are beneficial in several respects. For example, as depicted in FIGS. 7 and 8, a given box dimension can generally receive more containers in a side-by-side fashion when the containers are elliptical or oval (or non-circular as discussed above) due to the less amount of space between adjacent containers). Similarly elliptical or generally oval containers often are arranged more efficiently and effectively upon a store shelf than a circular container, due to the relatively "flatter" aspect ratio of the forward facing first and second side surfaces (which face outward toward the customer upon the shelf) than with cylindrical containers, which have a forward facing surface that is more curved. Moreover, many commercial stacked potato chip products are formed with a cross-section that is generally elliptical or oval, and not circular. Accordingly, a container that is also generally elliptical or oval will more closely approximate the cross-section of the potato chip and therefore allow a closer side wall to the outer edge of the stacked potato chips, which reduces the overall size and geometry of the side wall 18 and there resulting in less material used, less weight of the container, and a smaller overall container, which would allow for smaller shipping boxes of multiple containers, or potentially more containers included in a given size shipping box.

As discussed above, through experimentation, it has been found that the cross-sectional geometry disclosed above for the side wall of a container suitable for receipt of stacked potato chips has an optimized strength characteristics over other geometries that are available. Due to the significant changes in elevation, temperature, and humidity across the United State, and many other parts of the world implosion of containers (due, in part to relatively hot product being packaged in an environment with relatively low atmospheric pressure and being shipped to an environment of relatively high atmospheric pressure, although many other factors may result in a change in differential pressure from when the product was packaged to where the product is delivered) testing for implosion strength is often considered to be a significant acceptance test for a rigid container design.

Table A (below) provides the results of FEA testing to simulate the forces upon proposed packages of different dimensions due to typical worst case implosion risk (i.e. packaging the product with relatively high temperature, and a relatively low pressure, (barometric pressure) and transporting the product to a location with relatively low temperature, and relatively high pressure and barometric pressure). It has been determined that a differential pressure of 192 mbar for implosion risk (higher pressure outside of container) is a potential "worst case" differential pressure that might be felt by a package in circumstances that are reasonably expected for packages in the United States and potential markets outside the United States. The forces upon the proposed package dimensions was also analyzed with a potential worst case explosion risk (inner pressure greater than environmental pressure) which was determined to have a worst reasonable case of 100 mbar for explosion risk Sample G is constructed with the dimensions in the preferred embodiment described above, and was found to have unexpected results in significantly superior implosion performance in comparison with designs of various other geometries where the end portions have a constant radius as discussed below, as well as significantly superior explosion performance in comparison to the designs where the end portions have a constant radius as discussed below.

TABLE A

| Design | Size (mm) | Deformation Vacuum (mm) 192 mbar differential pressure (implosion) | Deformation Positive Pressure (mm) 100 mbar differential pressure (explosion) | Deformation Vacuum (% deformation) 192 mbar differential pressure (implosion) | Deformation Positive Pressure (% deformation) 100 mbar differential pressure (explosion) |
| --- | --- | --- | --- | --- | --- |
| Ellipse | 75 × 57 | 1.05 | 1.42 | 3.68% | 4.98% |
| A - Sides R53 | 75 × 57 × R53 | 1.35 | 1.83 | 4.74% | 6.42% |
| B - R62 | 75 × 57 – R62 | 1.744 | 2.362 | 6.12% | 8.29% |
| C - R123 | 75 × 57 – R123 | 2.315 | 2.652 | 8.12% | 9.31% |

TABLE A-continued

| Design | Size (mm) | Deformation Vacuum (mm) 192 mbar differential pressure (implosion) | Deformation Positive Pressure (mm) 100 mbar differential pressure (explosion) | Deformation Vacuum (% deformation) 192 mbar differential pressure (implosion) | Deformation Positive Pressure (% deformation) 100 mbar differential pressure (explosion) |
|---|---|---|---|---|---|
| D | 75 × 57 | 2.023 | 2.74 | 7.10% | 9.61% |
| E | 75 × 75 | 2.374 | 3.215 | 8.33% | 11.28% |
| F | 75 × 57 | 1.97 | 2.668 | 6.91% | 9.36% |
| G | 75 × 56.5 | 1.574 | 2.131 | 5.52% | 7.48% |
| Obround | 75 × 57 | 2.73 | 3.70 | 9.58% | 12.98% |

The samples tested are discussed as follows, with reference to FIG. 3 and Table B, below. In FIG. 3 the end portions are designated as element 120, 130, and the side portions are designated as elements 140, 150. The focus points are designated as 202, 202a and the geometric center is 201. The angle α is the angle from a line 1003 where the end portion 120/130 begins (and conversely where the side portion 140/150 ends). Line 1003 extends through the focus point 202/202a and is perpendicular to the line 1001, which extends through the geometric center 201 and the two focus points 202, 202a.

An obround design is one with parallel lines that form the side portions, and semicircles that form the end portions, wherein the ends of the semicircles are continuously connected to the ends of the parallel lines. Accordingly, the radius of the end portions is constant along its arc length. The ellipse is formed as a geometric ellipse with a longer length of 75 mm and a opposite width of 57 mm.

TABLE B

| Design | Radius of 120/130 (mm) | Radius of 140/150 (mm) | Angle α (deg) |
|---|---|---|---|
| A | varying | 53 | |
| B | varying | 62 | |
| C | varying | 123 | |
| D | 27.5 | varying | 22 |
| E | 28 | varying | 14 |
| F | 26 | varying | 40 |
| G | 27 | varying | 27 |
| Obround | 28.5 | n/a - sides are parallel lines | 0 |

The ellipse in some embodiments is not a preferred geometry for canisters for stacked food products, such as potato chips, due to identified customer preference factors.

Each sample (A-G and Obround) was FEA tested with a steady state differential pressure across the container, a first test for implosion with the differential pressure based upon a larger pressure outside the container than inside the container, and for explosion, with a larger pressure inside the container than outside the container.

It has been assumed based upon the material properties of the materials of the sidewall and the construction of the container, that a largest amount of deformation via implosion forces that will result in only elastic deformation of the container (and therefore not cause the container to collapse without recovering when the differential pressure is removed) is 6% deformation for implosion. With reference to Table A, the designs that were tested that exhibited less than 6% deformation vacuum were the elliptical design, design A and design G. Based upon perceived customer preferences, a design with flat or relatively flat front and back surfaces is preferred over designs with significantly curved front and rear surfaces as exhibited in design A as well as an elliptical design. Accordingly, because the elliptical design and design A are not commercially desirable, design G was the sole design with the necessary implosion strength design. Because design G exhibited less than 6% vacuum deformation this design is optimized strength for the desired approximate 75×57 mm size of the packaging.

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The invention claimed is:

1. A container for storing stacked food products, comprising:
 a composite body formed into an elongate enclosure between an open top end and a bottom end, the composite body including a plurality of layers that are fixed together, the composite body extending between the open top and bottom end with a consistent cross-section;
 the composite body includes a helical seam that extends between the open top end and the bottom end, the helical seam fixes elongate portions of the plurality of layers together,
 a closed bottom is fixed to the bottom end of the composite body, the closed bottom comprises a cardboard portion that extends across the bottom end of the composite body,
 the composite body includes an inner liner layer, a first body layer, a second body layer, and an outer layer, a first adhesive is provided to affix the inner liner layer to the first body layer, and a second adhesive is provided to affix the second body layer to the outer layer;
 the inner layer comprises one of PE or PET;
 the first and second body layers comprise cardboard;
 the outer layer comprises paper;
 the composite body comprises a constant horizontal cross-section along its length, wherein the horizontal cross-section includes opposite first and second end portions and opposite first and second side portions, wherein each of the first and second end portions are arcuate and each of the first and second side portions are arcuate,
 wherein the first and second side portions each extend between first and second ends and the first and second end portions each extend between first and second ends, wherein the first side portion extends from the first end of the second end portion and the second end of the first end portion and the second side portion extends from the second end of the second end portion and the first end of the first end portion;

wherein the first end portion has a constant radius about a first focus point and the second end portion has a constant radius about a second focus point, wherein the first and second focus point are both disposed upon a line that extends through a geometric center of the horizontal cross-section of the container, wherein each of the first and second side portions have a changing radius along its length extending from a minimum at each of the first and second ends thereof to a maximum at a center thereof, wherein transitions between the adjacent ends of the various end and side portions are continuous.

2. The container of claim 1, wherein each of the first and second side portions have the same geometry.

3. The container of claim 2, wherein each of the first and second end portions have the same geometry.

4. The container of claim 1, wherein the first and second end portions have a constant radius of 27 mm.

5. The container of claim 4, wherein the first and second focus points are each about 10.5 mm from the geometric center horizontal cross-section.

6. The container of claim 5, wherein the horizontal cross-section is about 75 mm long and about 56.8 mm wide.

7. The container of claim 1, wherein the line that extends through the first and second focus points and the geometric center of the horizontal cross-section establishes a mirror plane on opposite sides of the line.

8. The container of claim 7, further comprising a second line that extends through the geometric center and is perpendicular to the line, wherein the second line establishes a mirror plane on opposite sides of the second line.

9. The container of claim 1, wherein each transition between the respective first and second end portions and the respective first and second side portion includes at a position that is about 27 mm from the proximate first or second focus point and about 33.1 mm from the geometric center.

10. The container of claim 9, wherein the distance between the center of each of the first and second side portions and the geometric center is about 28.4 mm and the radius of the curve at the center of each of the first and second side portions is about 81.7 mm.

11. The container of claim 1, wherein an arc length of each of the first and second side portions is about 86.8 degrees.

12. The container of claim 1, wherein the first body layer extends between opposite first and second edges, and the second body layer extends between opposite first and second edges, wherein the first edge of the first body layer extends outward past the first edge of the second body layer, and wherein the second edge of the second body layer extends outward past the second edge of the first body layer, wherein the helical seam is formed with the first edge of the first body layer being overlapped with the second edge of the second body layer forming an adjacent portion of the composite body.

13. A container for storing stacked food products, comprising:

a composite body formed into an elongate enclosure between an open top end and a bottom end, the composite body including a plurality of layers that are fixed together, the composite body extending between the open top and bottom end with a consistent cross-section;

the composite body includes a helical seam that extends between the open top end and the bottom end, the helical seam fixes elongate portions of the plurality of layers together, a closed bottom is fixed to the bottom end of the composite body, the closed bottom comprises a cardboard portion that extends across the bottom end of the composite body, the composite body includes an inner liner layer, a first body layer, a second body layer, and an outer layer, a first adhesive is provided to affix the inner liner layer to the first body layer, and a second adhesive is provided to affix the second body layer to the outer layer;

the inner layer comprises one of PE or PET;

the first and second body layers comprise cardboard;

the composite body comprises a constant horizontal cross-section along its length, wherein the horizontal cross-section includes opposite first and second end portions and opposite first and second side portions, wherein each of the first and second end portions are arcuate and each of the first and second side portions are arcuate, wherein the first and second side portions each extend between first and second ends and the first and second end portions each extend between first and second ends, wherein the first side portion extends from the first end of the second end portion and the second end of the first end portion and the second side portion extends from the second end of the second end portion and the first end of the first end portion;

wherein the first end portion has a constant radius about a first focus point and the second end portion has a constant radius about a second focus point, wherein the first and second focus point are both disposed upon a line that extends through a geometric center of the horizontal cross-section of the container, wherein each of the first and second side portions have a changing radius along its length extending from a minimum at each of the first and second ends thereof to a maximum at a center thereof, wherein the transitions between the adjacent ends of the various end and side portions are continuous, wherein each transition between the respective first and second end portions and the respective first and second side portion includes at a position that is 27 mm from the proximate first or second focus point and 33.1 mm from the geometric center, and wherein the first and second end portions have a constant radius of 27 mm, and wherein an arc length of each of the first and second side portions is 86.8 degrees.

14. The container of claim 13, wherein the line that extends through the first and second focus points and the geometric center of the horizontal cross-section establishes a mirror plane on opposite sides of the line.

15. The container of claim 13, wherein the first and second focus points are each about 10.5 mm from the geometric center horizontal cross-section, and wherein the horizontal cross-section is 75 mm long and 56.8 mm wide.

16. The container of claim 13, further comprising a second line that extends through the geometric center and is perpendicular to the line, wherein the second line establishes a mirror plane on opposite sides of the second line, wherein the second line passes through a center of each of the first and second side portions.

17. The container of claim 13, wherein the distance between the center of each of the first and second side portions and the geometric center is 28.4 mm and the radius of the curve at the center of each of the first and second side portions is 81.7 mm.

18. The container of claim 13, wherein the first body layer extends between opposite first and second edges, and the second body layer extends between opposite first and second edges, wherein the first edge of the first body layer extends outward past the first edge of the second body layer, and wherein the second edge of the second body layer extends outward past the second edge of the first body layer,
 wherein the helical seam is formed with the first edge of the first body layer being overlapped with the second edge of the second body layer forming an adjacent portion of the composite body.

19. A container for storing stacked food products, comprising:
 a composite body formed into an elongate enclosure between an open top end and a bottom end, the composite body including a plurality of layers that are fixed together, the composite body extending between the open top and bottom end with a consistent cross-section;
 the composite body includes a helical seam that extends between the open top end and the bottom end, the helical seam fixes elongate portions of the plurality of layers together,
 a closed bottom is fixed to the bottom end of the composite body, the closed bottom comprises a cardboard portion that extends across the bottom end of the composite body,
 the composite body includes an inner liner layer, a first body layer, a second body layer, and an outer layer, a first adhesive is provided to affix the inner liner layer to the first body layer, and a second adhesive is provided to affix the second body layer to the outer layer;
 the inner layer comprises one of PE or PET;
 the first and second body layers comprise cardboard;
 the composite body comprises a constant horizontal cross-section along its length, wherein the horizontal cross-section includes opposite first and second end portions and opposite first and second side portions, wherein each of the first and second end portions are arcuate and each of the first and second side portions are arcuate,
 wherein the first and second side portions each extend between first and second ends and the first and second end portions each extend between first and second ends, wherein the first side portion extends from the first end of the second end portion and the second end of the first end portion and the second side portion extends from the second end of the second end portion and the first end of the first end portion;
 wherein the first end portion has a constant radius about a first focus point and the second end portion has a constant radius about a second focus point, wherein the first and second focus point are both disposed upon a line that extends through a geometric center of the horizontal cross-section of the container,
 wherein each of the first and second side portions have a changing radius along its length extending from a minimum at each of the first and second ends thereof to a maximum at a center thereof, wherein the maximum radius is 81.7 mm,
 wherein the transitions between the adjacent ends of the various end and side portions are continuous,
 wherein each transition between the respective first and second end portions and the respective first and second side portion includes at a position that is 27 mm from the proximate first or second focus point and 33.1 mm from the geometric center, and wherein the first and second end portions have a constant radius of 27 mm, and
 wherein an arc length of each of the first and second side portions is 86.8 degrees.

20. The container of claim 19, wherein the first body layer extends between opposite first and second edges, and the second body layer extends between opposite first and second edges, wherein the first edge of the first body layer extends outward past the first edge of the second body layer, and wherein the second edge of the second body layer extends outward past the second edge of the first body layer,
 wherein the helical seam is formed with the first edge of the first body layer being overlapped with the second edge of the second body layer forming an adjacent portion of the composite body.

\* \* \* \* \*